United States Patent Office 3,411,883
Patented Nov. 19, 1968

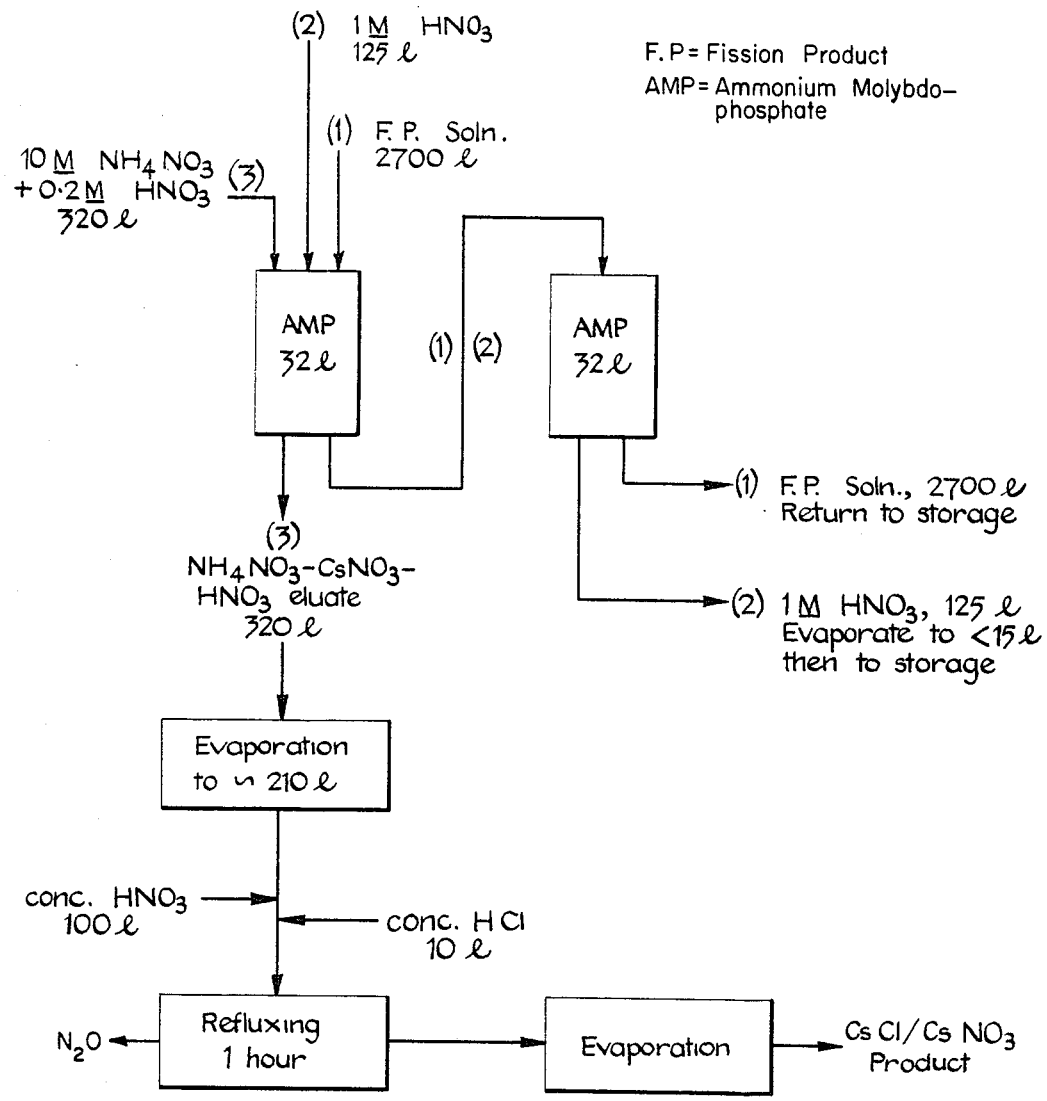

3,411,883
RECOVERY OF CESIUM AND NITROUS OXIDE FROM FISSION PRODUCT SOLUTIONS CONTAINING AMMONIUM NITRATE
Jakob Van Rouendal Smit, Pretoria, Transvaal, Republic of South Africa, assignor to South African Inventions Development Corporation, Council for Scientific and Industrial Research, Scientia, Pretoria, Transvaal, Republic of South Africa, a corporation of the Republic of South Africa
Continuation-in-part of application Ser. No. 310,974, Sept. 19, 1963. This application July 30, 1964, Ser. No. 386,360
9 Claims. (Cl. 23—25)

ABSTRACT OF THE DISCLOSURE

Ammonium nitrate is decomposed, e.g., to remove it from a fission product concentrate, such as cesium 137. The reaction proceeds under aqueous strongly acid conditions by refluxing. The main reaction product is nitrous oxide and the reaction can be controlled to yield almost pure nitrous oxide (laughing gas), wherefore the process can also be used for the manufacture of nitrous oxide.

---

This is a continuation-in-part of my application Ser. No. 310,974 filed on Sept. 19, 1963, now Patent No. 3,316,066, which is in turn a continuation-in-part of Serial No. 795,391 filed on Feb. 2, 1959, and now abandoned.

The present invention relates to the catalytic decomposition of ammonium compounds, more particularly when in aqueous solution containing nitrate ion and to processes to which such decomposition may be applied.

My above-mentioned application, Ser. No. 310,974, describes a process for selectively separating cesium cations from aqueous solutions of fission products. In the reprocessing of uranium or other nuclear fuels of atomic piles it is periodically required to remove so-called nuclear poisons, i.e., fission product nucleides of high neutron affinity formed in the fission process. The fuel elements are normally dissolved in nitric acid and the unspent fuel is recovered by solvent extraction. The remaining highly radioactive nitric acid solution, generally referred to as "fission product waste," presents considerable disposal problems. However, some of the constituents of this "waste" can be put to practical use if recovered at sufficiently low cost in adequate purity.

A particularly valuable "waste" constituent is cesium 137, which, because of its comparatively long half-life of about 33 years and the nature of its radioactivity, is a gamma radiation source of great potential for industrial and other purposes.

In my above-mentioned earlier application I describe a process for selectively separating cesium cations from an aqueous solution of mixed fission products including cesium 137 which comprises: percolating the aqueous solution through a bed of an ion exchanger comprising as its ion exchanging constituent a solid heteropolyacid salt of which the cationic part is at least partly composed of ammonium radicals and of which the anionic part comprises:

(i) a co-ordinating radical selected from the group consisting of molybdate and tungstate radicals, and
(ii) a hetero-radical selected from the group consisting of phosphate and arsenate radicals, thereby loading the bed with cesium; percolating through the bed at least one further aqueous liquid essentially inert to the anionic part of the ion exchanger to remove from the bed at least the bulk of all impurities previously retained while retaining at least part of the cesium absorbed by the bed; maintaining a pH below 6.0 in all aqueous liquids throughout their percolation through the bed, at least one of the said aqueous liquids having a pH not exceeding 2.7 during its percolation through the entire bed; and recovering a concentrated cesium product from the bed.

Further details of the afore-mentioned process are described in my said pending earlier application and by reference thereto are to be considered as part of the present disclosure. Additional features advantageous for the said process are described in my Patent No. 3,243,258, which features, in as far as they are relevant to the present invention, are also to be considered as part of the present disclosure.

The said application Serial No. 310,974 describes in detail various manners of recovering and further purifying the cesium separated by the process defined further above. In accordance with some of the preferred embodiments of the process the cesium is eventually obtained dissolved in a concentrated aqueous solution of ammonium nitrate. The only problem then remaining is the convenient recovery of cesium salt from this mixture. In my application Serial No. 310,974, I recommend removal of ammonium nitrate by decomposition thereof, i.e., with aqua regia or by refluxing the solution after acidification with HCl. From an economic and technical aspect a convenient and comparatively inexpensive manner of decomposing the ammonium nitrate constitutes an important facet of the process taken as a whole, which for this reason, has been the subject of further scrutiny and research.

Thus, according to one aspect of the invention it is an object of the invention to provide a process which comprises separating cesium 137 from fission product waste concentrates by selective absorption of the cesium on an ion exchanger by ion exchange, stripping the cesium from the loaded column, e.g., by elution with an ammonium salt, in particular ammonium nitrate, destructively removing the ammonium nitrate from the eluate and recovering cesium 137. The element may be acidified.

My investigation of the decomposition aspect of the process has, however, led to discoveries which may be applied to a very much wider field. Thus it is quite generally an object of the invention to provide a process for the removal of large quantities of ammonium nitrate from various aqueous fission product solutions in which ammonium nitrate is present as a result of treatment processes.

For example, ammonium nitrate is used in large quantities as a salting out agent in the solvent extraction treatment of spent nuclear fuels. It is envisaged that the residual aqueous fission product solution, which is almost saturated in respect of ammonium nitrate, may be treated by the process in accordance with the invention for the purpose of removing the ammonium nitrate from the solution. It is a further object of the invention to provide a process for the catalytic decomposition of ammonium ion in aqueous solution, in particular such ions in the form of the nitrate, suitable quite generally in industry as a convenient manner of eliminating unwanted ammonium from a mixture.

Yet another object of the invention is the provision of a process capable of being adapted to the manufacture of nitrous oxide ($N_2O$ or laughing gas) by the decomposition of ammonium and nitrate ions in aqueous solution.

Further objects of the invention will become apparent from the following description:

It is a well known technique in analysis to destroy ammonium nitrate by oxidation with aqua regia (concentrated nitric acid plus concentrated hydrochloric acid in a molar ratio of 1:3). In this reaction both reagents are consumed and red fumes of nitrogen dioxide ($N_2O_4$) in mixture with nitric oxide (NO) are formed.

The strong oxidizing action of aqua regia is ascribed by textbooks to chlorine formed according to the reaction.

$$HNO_3 + 3HCl \rightarrow NOCl + Cl_2 + 2H_2O$$

and the reaction with ammonium nitrate may then be formulated:

$$NH_4NO_3 + Cl_2 \rightarrow 2HCl + 2NO + H_2O$$

The NO formed will combine with atmospheric oxygen to form $N_2O_4$.

Ammonium salts other than ammonium nitrate can, for the purpose of formulation, be assumed to be converted to ammonium nitrate by the nitric acid present in the reaction mixture, and the ammonium nitrate may then be assumed to be oxidized according to the above type of reaction.

Thus according to the above mechanism, one mole of chloride is consumed per mole of ammonium nitrate, the nitrosyl chloride (B.P. 5.5° C.) escaping as a gas.

Also in accordance with well-known prior art, the technical production at present of nitrous oxide is carried out by thermally decomposing a melt of pure ammonium nitrate at 250–260° C. In this manufacture it is essential that chlorides are absent, because their presence leads to undesirable products at the expense of the desired laughing gas. Even at much lower temperatures, such as 145° C., the presence of traces of free acid and chloride ion in a melt of ammonium nitrate results in the formation of a gas containing 70% $N_2$ (Tramm & Velde, Angew. Chem. 47 (1934) No. 47, p. 782–4). The conditions are virtually anhydrous since mere traces of moisture or impurities will render the salt fusible at 145° C. and because conditions in such a melt of ammonium nitrate are such that essentially all the water formed in the decomposition will evaporate immediately. This chloride catalyzed reaction which takes place in a melt and which gives rise to a characteristic formation of nitrogen gas can also result in explosions. The aforementioned reference to a decomposition temperature of 145° C. is significant in that it constitutes the lowest temperature recorded in the literature in that context, all other investigations reported in the literature having been carried out with water-free ammonium nitrate at temperatures in excess of 170° C. A consideration of the prior literature implies that at lower temperatures no decomposition effects are to be expected.

I have now discovered a new reaction, capable of being put to industrial use, by which ammonium nitrate or ammonium compounds converted into ammonium nitrate may be decomposed partly or quantitatively at temperatures much lower than those mentioned above, even as low as 100° C. or less in an easily controlled manner and under aqueous conditions and in which reaction, contrary to the oxidation reaction with aqua regia, no significant amounts of chloride ion need go to waste.

More particularly the present invention is based on the surprising discovery that even minor amounts of chloride ion are capable in aqueous solution of catalyzing the complete decomposition of ammonium nitrate under conditions to be defined more precisely below and that, contrary to experience with molten ammonium nitrate, this decomposition can be controlled to yield almost exclusively nitrous oxide, a fact which proves that the decomposition reaction(s) involved is/are fundamentally different from those previously known and referred to above or from the oxidation reaction with aqua regia.

A very specific embodiment of one application of the process is shown in the accompanying drawing which illustrates a flow sheet of a process for recovering cesium 137 from fission product wastes and described in detail in Example 8.

Generally speaking the process in accordance with the invention for decomposing ammonium ions in the form of ammonium nitrate comprises carrying out the decomposition reaction with the ammonium salt dissolved in an aqueous solution of a strong mineral acid, the pH of the solution being below 0.1, nitrate ion being present in the solution in amounts at least chemically equivalent to the amount of ammonium ion, said solution furthermore containing chloride ions in an amount not exceeding 50% and preferably not exceeding 10% of the ammonium ions present, in terms of chemical equivalents, maintaining the reaction mixture at an elevated temperature, and essentially preventing the escape of chloride from the reaction system and preferably continuing the decomposition until the amount of ammonium removed from the system by the decomposition reaction at least exceeds, in terms of chemical equivalents, the amount of chloride originally in the system.

Preferably the reaction mixture is at least 0.4 normal in respect of total acidity resulting from free strong mineral acid, e.g., sulphuric acid, nitric acid and/or hydrochloric acid.

Preferably the solution constituting the reaction mixture is such as to be liquid at a temperature below 105° C., preferably below 100° C., and advantageously at room temperature. Expressed in different terms the solution contains preferably at least 10% water, but may be very much more dilute. In fact the decomposition reaction may be commenced in a solution containing more than 20 times as much water as ammonium nitrate, and, since the reaction may proceed to the quantitative elimination of ammonium nitrate, the ratio of water to ammonium nitrate approaches infinity.

Preferably the reaction is also carried out at a temperature below 145° C., say below 130° C. For special purposes as described further below even lower temperature limits are recommended.

The acidity of the reaction mixture may be derived from such strong mineral acids as sulphuric acid, nitric acid and hydrochloric acid, always bearing in mind the above stipulations that nitrate and chloride ion must be present in the reaction mixture.

Under widely varying conditions within the scope of the above definition the gaseous reaction product, disregarding water vapour, contains at least 90% volume by volume, as a rule at least 95% volume by volume of nitrous oxide.

The process may, for example, be carried out by maintaining the reaction mixture at or near its boiling point at prevailing pressure. The escape of chloride from the system may be partly or in the majority of cases essentially wholly prevented by carrying out the reaction under reflux. This is the simplest method but any other conceivable manner of retaining the chloride in the system while removing the decomposition products from the reaction system, will achieve the same result.

Without offering to attempt to explain the mechanism of the reaction, it would appear that the decomposition proceeds generally in accordance with the following reaction:

$$NH_4NO_3 \rightarrow N_2O + 2H_2O \qquad (1)$$

Four variables, viz, temperature and chloride, acid and ammonium nitrate concentration, affect the rate of reaction; an increase in any of these factors increases the reaction rate.

The following side reactions take place at the same time:

$$3HCl + HNO_3 \rightarrow NOCl + Cl_2 + 2H_2O \qquad (2)$$

$$3Cl_2 + 2NH_4NO_3 \rightarrow N_2 + 2HNO_3 + 6HCl \qquad (3)$$

and $$Cl_2 + NH_4NO_3 \rightarrow 2NO + 2HCl + H_2O \qquad (4)$$

reaction (2) (for aqua regia) being of greatest importance.

The nitrous oxide product is therefore contaminated by varying quantities of chlorine, nitrosyl, chloride, nitrogen and nitric oxide.

The same four factors enumerated above also affect the rate of the side reactions (2), (3) and (4), but since the rate of reaction (1) is already appreciable at concentrations too low for the side reactions to be important, nitrous oxide of purity >95% can be produced under appropriate conditions.

Widely varying conditions have been found suitable for producing nitrous oxide at a practical reaction rate, at or near the boiling point, and the following mixtures are typical:

20 g. $NH_4NO_3$, 50 ml. concentrated nitric acid, 25 ml. water, 2 ml. concentrated HCl;
50 g. $NH_4NO_3$, 12.5 ml. concentrated sulphuric acid, 37.5 ml. water, 2 ml. concentrated HCl;
25 g. $NH_4NO_3$, 0.5 ml. concentrated sulphuric acid, 3 ml. water, 0.5 ml. concentrated HCl.

Addition of porous pot, ground-class, etc. has been found to accelerate the reaction.

The extent of chlorine formation may be limited particularly effectively by carrying out the reaction at a comparatively low temperature, for example, not higher than 110° C., preferably not higher than 105° C.

Factors merely affecting the purity of nitrous oxide formed by the decomposition are of secondary importance when the destruction only of ammonium is contemplated. In such cases a reasonable reaction rate is important regardless of the reaction products, but at a minimum cost of reagents.

For example, experiments have shown that under reflux conditions in concentrated nitric acid solution the introduction of as little as 1 gram ion of chloride in the form of a 10 M aqueous solution for every 100 gram ions of ammonium in the original material was adequate to destroy 70% of the ammonium ion in a sample of ammonium nitrate in a period of half an hour of boiling under reflux. With 1 gram ion of chloride for every 50 grams ions of ammonium the reaction after half an hour was 97% complete. Using about 1 gram ion of chloride for every 25 gram ions of ammonium resulted in 99.8% destruction within half an hour. Using 1 gram ion of chloride for every 10 gram ions of ammonium resulted within half an hour of reflux boiling in a reaction more than 99.995% complete. From these figures it is clear that results useful in practice may be attained, using amounts of chloride in the range of between 1 and 10 gram ions of chloride for every 100 gram ions of ammonium. For most purposes a higher relative initial concentration of chloride would be wasteful.

The chloride remains in the system and, acting catalytically, is not used up except as a result of the escape of a small proportion of chlorine gas and nitrosyl chloride formed in side reactions.

The following additional examples serve to illustrate the process in cases where a high yield of nitrous oxide is desired.

EXAMPLE 1

To test the yield of the reaction, four experiments were carried out in which 3.000, 3.000, 4.014 and 4.007 g. of ammonium nitrate were boiled under reflux with a mixture of 25 ml. of concentrated nitric acid, 25 ml. of water and 2.0 ml. of concentrated hydrochloric acid, collecting the nitrous oxide gas evolved over saturated sodium sulphate solution (rather than water, to reduce solubility of the gas). Boiling was continued for about an hour until no further gas evolved. The volumes of gas collected, when reduced to S.T.P., were 810, 821, 1124 and 1090 ml., respectively, which are 96.4%, 97.7%, 100.7% and 97.1% of the volume expected from theory.

EXAMPLE 2

The yield was also determined by similarly refluxing 25.00 g. of ammonium nitrate with 0.5 ml. of concentrated sulphuric acid, 25 ml. of water and 0.5 ml. of hydrochloric acid until about half the ammonium nitrate was consumed. A few millilitres of 1:1 sulphuric acid were added in the course of the reaction to maintain the acid concentration (water formed from the ammonium nitrate progressively dilutes the solution) and hence the reaction rate. The residual ammonium nitrate was then determined by Kjeldahl distillation to obtain the amount of ammonium nitrate consumed. In two separate experiments the volumes of nitrous oxide gas collected over saturated sodium sulphate solution, when reduced to S.T.P., were 3720 ml. and 3570 ml., which were 94.7% and 98.4%, respectively, of that expected from theory for the 14.04 and 12.95 g. respectively, of ammonium nitrate consumed. If the small solubility of nitrous oxide in the saturated sodium sulphate solution (for which no correction could be applied) is borne in mind, it is clear that the nitrous oxide yield is >95% and close to the theoretical.

EXAMPLE 3

The following two mixtures were boiled under reflux essentially as in the previous example:

Sample 1: 50 g. $NH_4NO_3$, 12.5 ml. concentrated $H_2SO_4$, 27.4 ml. water and 2.0 ml. concentrated HCl.
Sample 2: 100 g. $NH_4NO_3$, 2.0 ml. concentrated $H_2SO_4$, 12.0 ml. water and 2.0 ml. concentrated HCl.

The gas resulting from the reaction was analyzed for nitrogen. The results were:

(1) 0.3% and (2) 0.4% nitrogen.

The gas mixtures were also analyzed for chlorine (iodometrically) and the figures obtained were between 0.3 and 1.5% (which figures would include nitric oxide and nitrosyl chloride if present).

EXAMPLE 4

The experiment of Example 3 was repeated, whilst the temperature was kept in the range 100–110° C. The gas (2036 ml.) was evolved at the overall rate of 35 ml. (corrected to S.T.P.) per minute, and analyzed 0.15% chlorine.

EXAMPLE 5

The previous example was repeated but the amount of hydrochloric acid was halved, and the sulphuric acid and water content doubled. A slightly higher temperature was now required to give the same reaction rate, and the gas collected (2036 ml.) was in fact evolved at the boiling point (>120° C.), at an overall rate of 50 ml. (at S.T.P.) per minute. It analyzed at 0.99% $Cl_2$. By scrubbing the gas with sodium hydroxide it was possible to produce nitrous oxide essentially free of nitric oxide and chlorine.

The following examples illustrate the industrial applications of the process in which the main object is the destructive removal of ammonium nitrate from a system:

EXAMPLE 6

Separation of cesium from simulated fission product waste concentrate.—For this experiment a solution of the following composition, corresponding to typical fission product waste concentrate, was used:

| Fission product elements: | Concentration, g./l. |
|---|---|
| Cs | 1.000 |
| Rb | 0.13 |
| Sr | 0.35 |
| Ba | 0.36 |
| Y | 0.20 |
| La | 0.35 |
| Nd | 0.84 |
| Ce | 0.75 |
| Zr | 1.03 |
| Non-fission elements: | |
| U | 60 |
| Fe | 30 |
| Al | 25 |
| Cr | 2 |
| Ni | 3 |

$HNO_3$ concentration: 3 molar.

The solution was spiked by addition of 10 ml. of a solution containing 2 millicuries of 18 months old mixed fission product activity.

The first column bed consisted of 22 ml. of 40–60 B.S. mesh APM (prepared according to method described in my aforementioned Patent No. 3,243,258) packed in a jacketed glass column to give a bed of dimensions 3.5 cm.² x 6.3 cm. Water at a temperature of 40° C. was circulated through the jacket during the experiment. Of the above solution 2750 ml. were percolated through the column at a linear flow rate of 2.5 cm./min. and this was followed by washing the column with 100 ml. of 1 M $HNO_3$. Analysis of effluent samples showed that breakthrough of cesium occurred at about 1000 ml. and that about 65 percent of all the cesium had been retained by the column.

The temperature of the column was now raised to 90° C. and elution was carried out with a 5 M ammonium nitrate solution in concentrated nitric acid at a linear flow rate of 1 cm./min. More than 95 percent of the cesium was displaced by 270 ml. (12 column volumes) of this eluent. Cesium salt essentially free from ammonium nitrate was recovered from the effluent by adding 10 ml. of concentrated hydrochloric acid, heating the mixture under reflux for an hour and evaporating to dryness.

EXAMPLE 7

Reducing the volume of fission product to facilitate waste disposal.—A metallic uranium rod is irradiated in a pile and after a period of storage is dissolved in nitric acid. The resulting solution is saturated at room temperature with ammonium nitrate and extracted with an organic solvent in a manner known per se to recover plutonium. Uranyl nitrate is then removed by solvent extraction with diethyl ether or methylisobutyl ketone after having been neutralized with ammonium hydroxide. In the resulting residual solution fission products and ammonium nitrate are present in a ratio of approximately 1:35,000 the water content being almost 50%. One volume of concentrated hydrochloric acid is added to every 30 volumes of the solution to be treated. The reaction mixture is boiled under reflux until the liberation of nitrous oxide has substantially ceased and is then evaporated down to near dryness at atmospheric pressure. It is found that ammonium nitrate has been disposed of virtually quantitatively.

Substantially the same procedure may be applied for the removal of ammonium nitrate from the residual solution resulting from the solvent extraction treatment of spent nuclear fuels.

If for any reason whatsoever the quantitative decomposition proceeds too slowly the solution may be concentrated by evaporation in between two or more decomposition stages.

EXAMPLE 8

Industrial preparation of cesium 137, 67,000 curies per two day cycle.—Referring now to the flow sheet accompanying this specification, 2700 l. of fission product solution (F.P.; stream 1) are percolated through columns connected in series and packed with ammonium molybdophosphate (AMP) prepared in accordance with my Patent No. 3,243,258. Each column has a volume of 32 l.; depth to diameter ratio is 3. The starting solution is a Butex 150 fold concentrate containing 1.00 g. of cesium per litre (25 curies). A flow rate of 2.5 cm./min. is maintained equivalent to a throughput of 3200 l./h.

This is followed by (2) washing both columns with 125 l. 1 M $HNO_3$. The wash liquid is evaporated to less than 15 l. and added to the Cs-depleted F.P. solution.

The first column is now (3) eluted with 320 l. 10 M $NH_4NO_3$+0.2 M $HNO_3$. The efficiency of the elution is improved by heating the column to 90° C. The eluate containing the Cs-137 is evaporated to approximately 210 l. To this concentrate are added 100 l. concentrated $HNO_3$ and 10 l. concentrated HCl. The reaction mixture is boiled under reflux for one hour and evaporated to dryness to yield a mixture of cesium chloride and cesium nitrate essentially free of ammonium nitrate.

For the next cycle the two columns are interchanged and this may be repeated several times.

Assuming 300 round-the-clock working days and an average throughput of 3150 l/48 h. instead of the 3200 liters aforementioned, a production rate of 10 megacuries p.a. is achieved.

Using nitric acid concentrations above about 0.5 M $HNO_3$ in the ammonium nitrate eluent, the useful life of the columns is reduced significantly. Preference has therefore been given to an eluent comprising 10 M ammonium nitrate in 0.2 nitric acid under which conditions the greatest stability was observed.

Rubidium is partly co-adsorbed with cæsium, but is largely eliminated during subsequent washing. Rubidium occurs as a minor contaminant in the early parts of the eluate. This minor contamination can be eliminated when required by first eluting with a more dilute ammonium nitrate solution.

What I claim is:

1. A process for decomposing ammonium ions in the form of ammonium nitrate by a reaction resulting in the formation of nitrous oxide and water which comprises:
    (a) bringing about the decomposition reaction with the ammonium salt dissolved in an aqueous solution of a strong mineral acid, the pH of the solution being below 0.1;
    (b) the feature of nitrate ion being present in the solution in amounts at least chemically equivalent to the amount of ammonium ion;
    (c) the feature of said solution furthermore containing chloride ions in an amount not exceeding 50% of the ammonium ions present in terms of chemical equivalents;
    (d) maintaining the reaction mixture at a temperature between 100 and 145° C.,
    (e) refluxing, thereby preventing the escape of chloride whilst allowing the escape of nitrous oxide from the reaction system; and
    (f) continuing the decomposition until substantially all ammonium is removed from the system by the decomposition reaction.

2. A process as claimed in claim 1 carried out with a reaction mixture containing at least 10% water.

3. A process as claimed in claim 2 carried out with a reaction mixture containing up to 1 equivalent of chloride ion for every ten equivalents of ammonium ion present in the mixture.

4. A process for decomposing ammonium ions in the form of ammonium nitrate which comprises:
    (a) preparing an aqueous acid solution of ammonium nitrate containing at least 10% water, a maximum of 1 gram ion of chloride ion for every 10 moles of ammonium nitrate and a minimum total free acid content of 0.4 N resulting from strong mineral acid selected from the acids sulphuric acid, nitric acid and hydrochloric acid;
    (b) heating said solution at a temperature between 100 and 110° C. to bring about said decomposition;
    (c) refluxing, thereby essentially retaining chloride ion in the reaction system while said decomposition proceeds; and
    (d) removing from said reaction system while said decomposition proceeds a gaseous decomposition product which, disregarding water vapour, contains at least 95% volume by volume of nitrous oxide.

5. A process of treating aqueous solutions containing ammonium nitrate and a fission product which comprises:
    (a) heating said solution to between substantially 100 and 145° C. ion in amounts not exceeding 50% of the ammonium nitrate in terms of chemical equivalents and at a pH below 0.1;
    (b) refluxing, thereby inhibiting the escape of chloride ion from the solution during said heating;

(c) removing from contact with said solution the gaseous decomposition product during said heating; and (d) continuing steps (a) to (c) until substantially all the ammonium nitrate has been decomposed; and (e) recovering the fission product substantially free of ammonium nitrate.

6. A process as claimed in claim 5 in which the water of the solution is evaporated off after decomposition of ammonium nitrate has been achieved.

7. A process as claimed in claim 5 which comprises:
(i) separating cesium 137 from fission product waste concentrates by selective absorption of the cesium on a cation exchanger by ion exchange;
(ii) stripping the cesium from the loaded cation exchanger with an ammonium salt;
(iii) decomposing the ammonium salt in the form of ammonium nitrate in the manner defined in claim 9; and
(iv) recovering a salt of cesium 137.

8. A process as claimed in claim 5 applied to the destructive removal of ammonium nitrate previously introduced into a solution of fission products as a salting out agent in the course of solvent extraction, to produce a fission product material of reduced bulk volume.

9. A process for selectively separating cesium cations from an aqueous solution of fission products containing cesium 137 and impurities and involving freeing a cesium 137 concentrate of ammonium nitrate by a reaction resulting in the formation of nitrous oxide and water which process comprises percolating the aqueous solution through a be dof an ion exchanger comprising as its ion exchanging constituent a solid heteropolyacid salt of which the cationic part is at least partly composed of ammonium radicals and of which the anionic part comprises:
(i) a co-ordinating radical selected from the group consisting of molybdate and tungstate radicals, and
(ii) a hetero radical selected from the group consisting of phosphate and arsenate radicals,
thereby loading the bed with cesium;

percolating through the bed at least one further aqueous liquid essentially inert to the anionic part of the ion exchanger to remove at least the bulk of all impurities previously retained by the bed from the bed while retaining at least part of the cesium adsorbed by the bed;

maintaining a pH below 6.0 in all aqueous liquids throughout their percolation through the bed, at least one of the said aqueous liquids having a pH not exceeding 2.7 during its percolation through the entire bed;

eluting the cesium previously retained from the bed by percolating through the bed an aqueous solution of ammonium nitrate having a pH below 6.0;

decomposing the latter ammonium nitrate by adding to its said aqueous solution hydrochloric acid to bring the pH of the solution to below 0.1 and the chloride ion content of said solution to an amount not exceeding 50% of the ammonium ions present in terms of chemical equivalent and heating the resulting reaction mixture to between 100 and 145° C. under reflux conditions designed to prevent the escape of chloride whilst allowing the escape of nitrous oxide from the system;

and evaporating the solution to dryness to recover a concentrated purified cesium product.

References Cited

UNITED STATES PATENTS

| | | | |
|---|---|---|---|
| 2,111,277 | 3/1938 | Castner et al. | 23—158 |
| 2,838,368 | 6/1958 | Boyer et al. | 23—50 X |
| 2,925,323 | 2/1960 | Rimshaw | 23—25 |
| 2,955,019 | 10/1960 | Dickert et al. | 23—102 X |

OTHER REFERENCES

Meier et al., "Helvetica Chimica Acta," vol. 34, No. 1, 1951, pp. 155–168.

EARL C. THOMAS, *Primary Examiner.*

G. T. OZAKI, *Assistant Examiner.*